United States Patent
Lauwers et al.

(10) Patent No.: US 12,069,988 B2
(45) Date of Patent: Aug. 27, 2024

(54) ADJUSTABLE EAR DAM FOR A CORN HEADER

(71) Applicant: CNH Industrial America LLC, New Holland, PA (US)

(72) Inventors: Andrew V. Lauwers, Sandusky, OH (US); Bradley J. Wenger, Leola, PA (US)

(73) Assignee: CNH Industrial America LLC, New Holland, PA (US)

( * ) Notice: Subject to any disclaimer, the term of this patent is extended or adjusted under 35 U.S.C. 154(b) by 703 days.

(21) Appl. No.: 17/283,735

(22) PCT Filed: Oct. 11, 2019

(86) PCT No.: PCT/US2019/055825
§ 371 (c)(1),
(2) Date: Apr. 8, 2021

(87) PCT Pub. No.: WO2020/077203
PCT Pub. Date: Apr. 16, 2020

(65) Prior Publication Data
US 2021/0378178 A1    Dec. 9, 2021

Related U.S. Application Data

(60) Provisional application No. 62/744,731, filed on Oct. 12, 2018.

(51) Int. Cl.
*A01D 57/22* (2006.01)
*A01D 45/02* (2006.01)

(52) U.S. Cl.
CPC ........... *A01D 57/22* (2013.01); *A01D 45/021* (2013.01); *A01D 45/023* (2013.01)

(58) Field of Classification Search
CPC ...... A01D 45/021; A01D 63/00; A01D 63/02; A01D 63/04; A01D 57/22; A01D 45/02–45/023; A01D 43/08–43/088
See application file for complete search history.

(56) References Cited

U.S. PATENT DOCUMENTS

| 1,859,208 A | 5/1932 | Kane |
| 2,044,396 A * | 6/1936 | Perau ..................... A01D 45/22 56/67 |

(Continued)

FOREIGN PATENT DOCUMENTS

| EP | 2018802 A1 | 1/2009 |
| FR | 1396554 A | 4/1965 |
| FR | 2596609 A1 | 10/1987 |

OTHER PUBLICATIONS

International Search Report and Written Opinion for PCT Application No. PCT/US2019/055825 dated Feb. 4, 2020 (11 pages).

*Primary Examiner* — Thomas B Will
*Assistant Examiner* — Madeline I Runco
(74) *Attorney, Agent, or Firm* — Peter K. Zacharias; Rebecca L. Henkel; Rickard K. DeMille (57) ABSTRACT

An agricultural header connectable to an agricultural vehicle including a frame, at least one row unit connected to the frame and including at least one gathering chain, at least one crop dividing member connected to the frame, and a crop saving attachment supported by the at least one crop dividing member and being adjustable between a lowered position and a raised position. The crop saving attachment including a base member fixedly attached to the at least one crop dividing member, an upper member movably attached to the base member and configured for adjusting between the lowered and raised positions, and a pair of flaps supported by the base member and slideably associated with the upper (Continued)

member so that a resting position of the pair of flaps remains substantially unchanged as the upper member is adjusted.

19 Claims, 4 Drawing Sheets

(56) References Cited

U.S. PATENT DOCUMENTS

| | | | |
|---|---|---|---|
| 2,473,978 A | | 6/1949 | Buskirk |
| 2,840,973 A | * | 7/1958 | Thomson ............... A01D 45/10 56/15.2 |
| 2,989,834 A | | 6/1961 | Pool et al. |
| 4,037,393 A | | 7/1977 | Anderson |
| 4,300,335 A | | 11/1981 | Anderson |
| 4,493,181 A | | 1/1985 | Glendenning et al. |
| 5,444,968 A | * | 8/1995 | Barton ................. A01D 45/021 56/119 |
| 7,240,471 B2 | | 7/2007 | Mossman |
| 7,658,058 B2 | | 2/2010 | Pierson |
| 9,265,198 B2 | | 2/2016 | Hulstein et al. |
| 9,532,505 B2 | | 1/2017 | Long et al. |
| 2014/0260165 A1 | | 9/2014 | Lohrentz |
| 2017/0339827 A1 | | 11/2017 | Anderson et al. |
| 2017/0367262 A1 | | 12/2017 | Lohrentz |
| 2018/0054971 A1 | | 3/2018 | Gessel et al. |

* cited by examiner

ADJUSTABLE EAR DAM FOR A CORN HEADER

FIELD OF THE INVENTION

The present invention pertains to headers for agricultural harvesters and, more specifically, to crop saving attachments for corn headers.

BACKGROUND OF THE INVENTION

An agricultural harvester known as a "combine" is historically termed such because it combines multiple harvesting functions with a single harvesting unit, such as picking, threshing, separating, and cleaning. A combine includes a header which removes the crop from a field and a feeder housing which transports the crop matter into a threshing rotor. The threshing rotor rotates within a perforated housing, which may be in the form of adjustable concaves, and performs a threshing operation on the crop to remove the grain. The threshing rotor is provided with rasp bars that interact with the crop matter in order to further separate the grain from the crop matter, and to provide positive crop movement. Once the grain is threshed, the grain is cleaned using a cleaning system. The cleaning system includes a cleaning fan which blows air through oscillating sieves to discharge chaff and other debris toward the rear of the combine. Non-grain crop material, such as straw, from the threshing section proceeds through a straw chopper and out the rear of the combine. Clean grain is transported to a grain tank onboard the combine.

A typical header generally includes a frame, a pair of end dividers at the lateral ends of the frame, a cutter to remove crop material from the field, and a conveyor to transport the cut crop material to the feeder housing for further downstream processing in the combine. Generally, these features of a typical header are specifically optimized to harvest a particular kind of crop material. For instance, to harvest rows of corn, the header may be in the form of a corn header which generally includes snouts, a conveyor, row units, and accompanying drive architecture to power the header. The snouts are conically shaped to pass in between the rows of corn, defining a designated passageway or gap in between the snouts for the rows of corn to travel therein. The conveyor is disposed aft of the row units and transports the crop material to the center of the header for entry into the feeder house. The conveyor may be in the form of a conveyor belt, an auger with a tubular shaft having left and right flighting, or a combination of both. The row units generally include gathering chains, stalk rolls, and respective gear boxes to drive the gathering chains and stalk rolls. As the agricultural vehicle traverses the field, the corn stalks are pulled inwardly by the gathering chains and downwardly by the stalk rolls. This motion causes the ears of corn to contact the base of the header and snap off their respective stalks. The gathering chains additionally help to move crop material inwardly towards the conveyor. The stripped corn stalks are further pinched and crushed by the stalk rolls, in order to accelerate the decomposition process of the stalks. The header may also include chopping units that have reciprocating blades located beneath the stalk rolls to chop the stalks, leaves, and other debris (also known as material other than grain "MOG") to more easily incorporate the remaining residue in subsequent tillage practices.

In order to prevent grain loss, some corn headers may further include various corn saving attachments connected to each row divider. As can be appreciated, once the ears of corn are separated from the stalk, it is possible for loose crop material, such as down corn, separated ears of corn, free corn kernels, etc., to fall out of the forward end of the corn header before the loose crop material can be transported into the conveyor section of the corn header. One type of corn saving attachment is an ear loss inhibitor, such as an ear dam or ear cover, which prevents loose crop material from falling out of the corn header. For example, the ear dam can be in the form of a profiled body with a ramped section and a rear flat face that prevents crop material from sliding out of the header. Additionally, for example, ear covers, i.e., flaps, can be coupled to adjacent sides of the row divider and thereby extend inwardly into the gap between juxtaposed row dividers. These flaps are located just above the gathering chains and thereby create a barrier directly above the gathering chains within the gap between juxtaposed row dividers. In more detail, the deformable and/or hingedly attached flaps may deform or pivot to allow the corn stalks to enter through the gaps between the row dividers but subsequently prevent loose crop material from falling out of this gap. Such ear loss inhibitors are valuable for increasing crop yield; however, they are generally not adjustable or easily interchangeable in order to accommodate various kinds of crop material. Furthermore, corn saving attachments may be complex and cumbersome to maintain.

What is needed in the art is a cost-effective and adjustable crop saving attachment.

SUMMARY OF THE INVENTION

In one exemplary embodiment formed in accordance with the present invention, there is provided a crop saving attachment for a corn header. The crop saving attachment is in the form of an adjustable, multipart ear dam which generally includes a base part, a shell cover part that can be raised or lowered, and a pair of flaps or covers that are connected to the base part or cover part. The rear of the cover part has designated slots which are associated with the flaps such that the slots allow the flaps to remain at a constant position relative to the gathering chains of the row units as the cover part is raised.

In another exemplary embodiment formed in accordance with the present invention, there is provided an agricultural header connectable to an agricultural vehicle including a frame, at least one row unit connected to the frame and including at least one gathering chain, at least one crop dividing member connected to the frame, and a crop saving attachment supported by the at least one crop dividing member and being adjustable between a lowered position and a raised position. The crop saving attachment including a base member fixedly attached to the at least one crop dividing member, an upper member movably attached to the base member and configured for adjusting between the lowered and raised positions, and a pair of flaps supported by the base member and slideably associated with the upper member so that a resting position of the pair of flaps remains substantially unchanged as the upper member is adjusted.

In another exemplary embodiment formed in accordance with the present invention, there is provided a crop saving attachment for a crop dividing member of an agricultural header. The crop saving attachment includes a base member configured for attaching to the crop dividing member, an upper member movably attached to the base member and configured for adjusting between a lowered position and a raised position, and a pair of flaps supported by the base member and slideably associated with the upper member so that a resting position of the pair of flaps remains substantially unchanged as the upper member is adjusted.

In another exemplary embodiment formed in accordance with the present invention, there is provided a method for selectively varying a crop saving capability of an agricultural header. The method includes the step of providing a crop saving attachment configured for attaching to the agricultural header and adjusting between a lowered position and a raised position. The crop saving attachment including a base member fixedly attached to the at least one crop dividing member, an upper member movably attached to the base member and configured for adjusting between the lowered and raised positions, a pair of flaps supported by the base member and slideably associated with the upper member so that a resting position of the pair of flaps remains substantially unchanged as the upper member is adjusted, and at least one actuator connected to the base member and the upper member. The method also includes the steps of raising, by the at least one actuator, the upper member to be in the raised position to more aggressively save the crop material, and lowering, by the at least one actuator, the upper member to be in the lowered position to less aggressively save the crop material.

One possible advantage of the exemplary embodiment of the corn header is that the operator of the agricultural header can selectively adjust the height of the ear dam in order to vary the crop saving ability of the agricultural header as desired.

Another possible advantage of the exemplary embodiment of the corn header is that an adjustment of the height of the ear dam does not impair the functionality of the flaps of the agricultural header.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also, the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting. The terms "downstream" and "upstream" are determined with reference to the intended direction of crop material flow during operation, with "downstream" being analogous to "rearward" and "upstream" being analogous to "forward."

Figure 1:
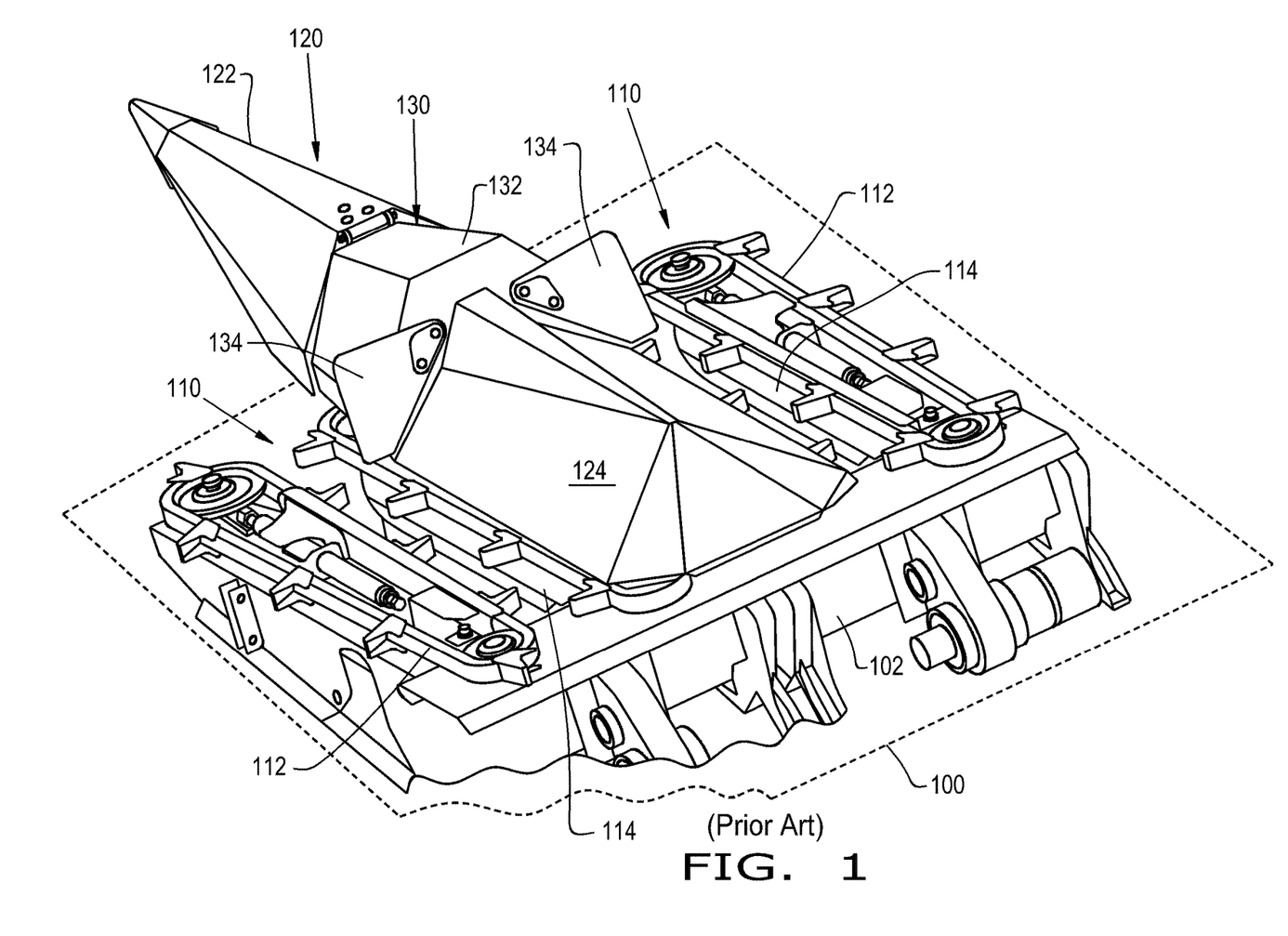
FIG. 1 illustrates a perspective view of a known corn header with a crop material divider that includes a corn snout and a conventional ear dam attached thereto.

Referring now to the drawings, and more particularly to FIG. 1, there is shown a conventional agricultural header 100 in the form of a corn header 100, which is attachable to an agricultural vehicle, such as a combine harvester (not shown). The corn header 100 includes a frame 102, row units 110, crop dividing members 120, an auger (not shown), and a crop saver 130, such as an ear dam 132 with ear savers 134, e.g. flaps 134, attached thereto. Each row unit 110 generally includes a pair of gathering chains 112, a pair of stalk rolls 114, and a pair of choppers located underneath the stalk rolls 114 (not shown). The crop dividing members 120 in part define a crop receiving slot or gap therebetween for crop material, such as rows of corn stalks, to enter the corn header 100. The crop dividing members 120 generally consist of a pivoting corn snout 122 and a hood 124 that is connected to the frame 102 of the corn header 100.

As the combine harvester traverses a field in a forward direction, the standing corn stalks enter the header 100 through the crop receiving slots between juxtaposed crop dividing members 120. Through the motion of the gathering chains 112 and stalk rolls 114, the ears of corn are stripped from the stalks upon forcibly hitting the deck plates of the corn header 100. The ear dam 132 in conjunction with the flaps 134 prevent the ears of corn, or other down or loose crop material, from falling out of the header 100. The ears of corn are then gathered by the auger and are transported to the center of the header 120 for entry into the feeder house and subsequent downstream processing through the agricultural vehicle (not shown). The stalks and the remaining MOG are pulled down by the stalk rolls 114 and may be chopped into smaller pieces by the chopper (not shown).

The ear dam 132 of the crop saver 130 can be separately connected in between the hood 124 and corn snout 122, or the ear dam 132 can be integrally formed with the hood 124 such that it is part of the crop dividing member 120. The flaps 134 are fixedly attached to the ear dam 132 by way of fasteners, such as nuts and bolts. Each flap 134 has an outer edge which stretches at least partially into the gap between the crop dividing members and a bottom edge that rests slightly above a respective gathering chain for preventing the ears of corn from escaping through the gap between the crop dividing members. As can be appreciated, the profile and overall size of the ear dam 132 along with the size of the flaps 134 effectively determines the ability of the crop saver 130 to prevent loss of crop material. Generally, the ear dam 132 and flaps 134 are accordingly sized in order to minimize crop material loss for a particular type of crop material. Hence, the size and shape of the crop saver 130 cannot accommodate a variety of crop material, nor can the crop saver 130 be adjusted without interchanging a preexisting ear dam 132 or flap 134 with a new, differently-sized ear dam 132 or flap 134.

Referring now to FIGS. 2-5, there is shown an agricultural header 200, such as a corn header 200, according to an exemplary embodiment of the present invention. The corn header 200 may be attached to a combine harvester, as discussed above. The corn header 200 generally includes a frame 202, one or more row unit(s) 210, one or more crop dividing member(s) 220, an auger (not shown), and a crop saving attachment 230.

Each row unit 210 is connected to the frame 202 of the corn header 200 and generally includes a pair of gathering chains 212, a pair of stalk rolls 214, and a pair of choppers located underneath the stalk rolls 214 (not shown). The row unit 210 can be in the form of the row unit 110 as discussed above.

Each crop dividing member 220 is connected to the frame 202 and generally includes a snout 222 that is pivotally connected to the crop saving attachment 230 and a hood 224 that is fixedly attached to the frame 202. Adjacent crop dividing members 220 define a crop receiving slot or gap therebetween for crop material, such as rows of corn stalks, to enter therein. The crop dividing members 220 can be in the form of any desired crop dividing members 220 and may or may not include corn snouts as shown.

Figure 2:
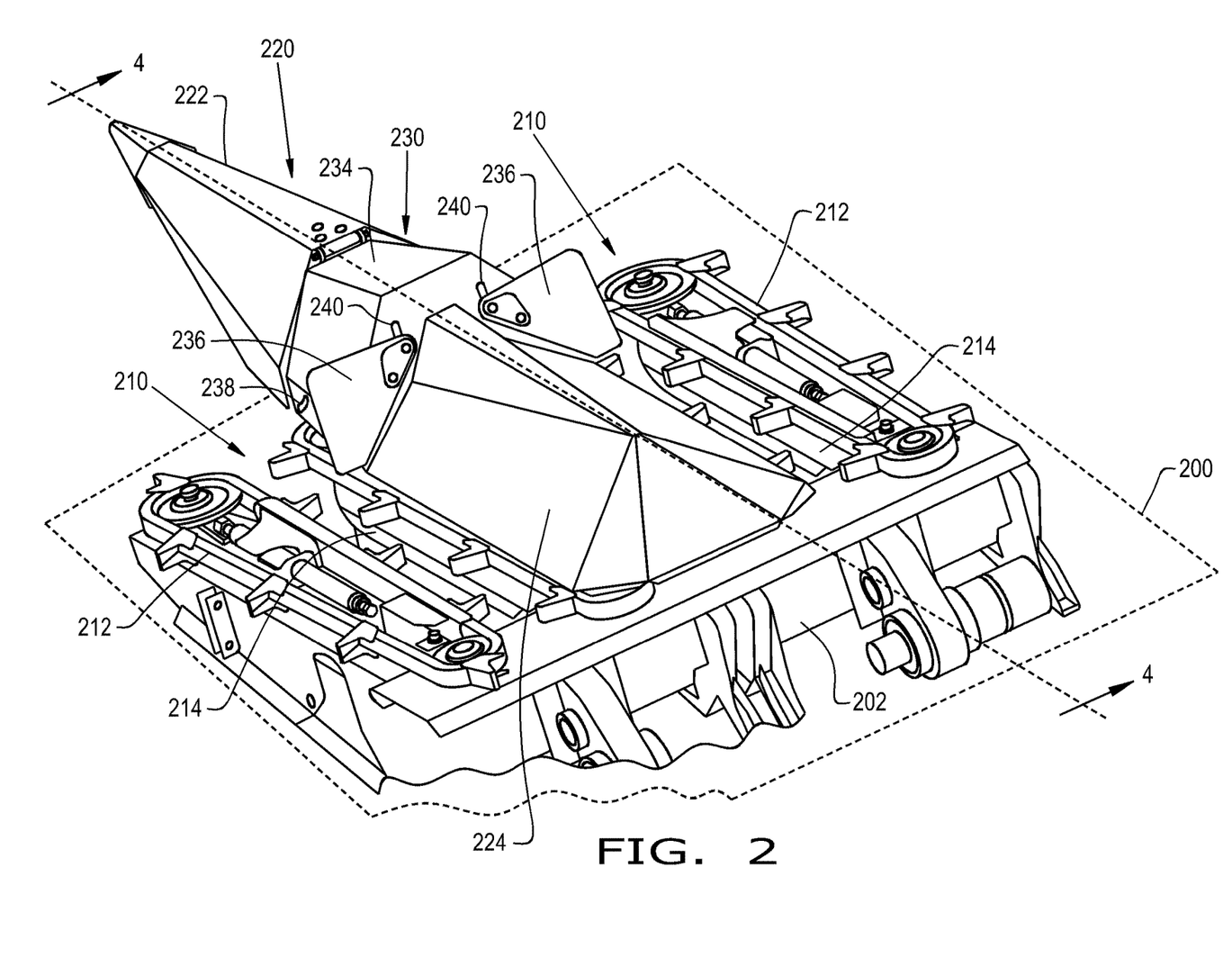
FIG. 2 illustrates a perspective view of an exemplary embodiment of an agricultural header, the agricultural header including a crop material divider with an adjustable crop saving attachment in a lowered position, in accordance with an exemplary embodiment of the present invention.
Figure 3:
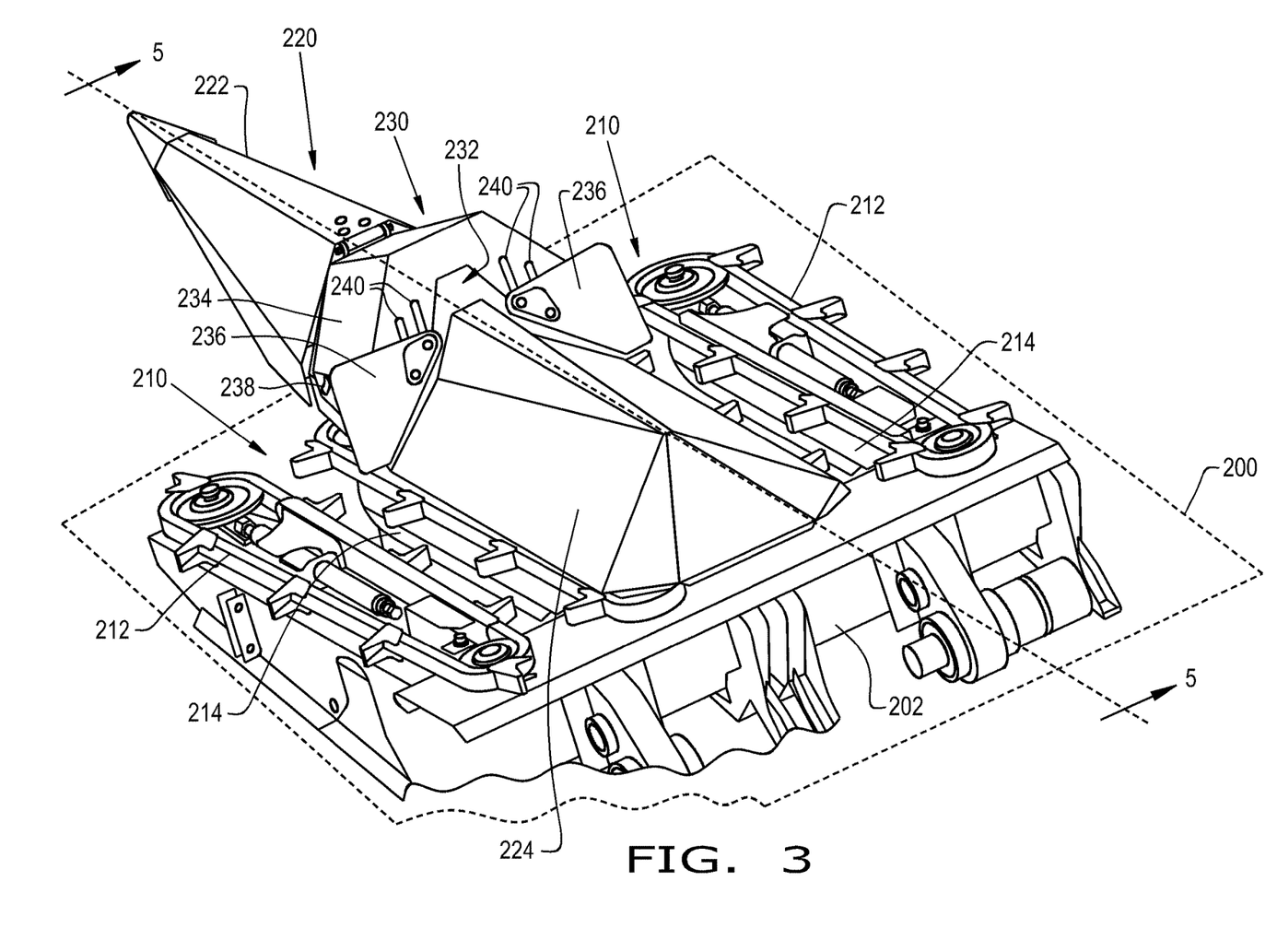
FIG. 3 illustrates a perspective view of an exemplary embodiment of an agricultural header, the agricultural header including a row divider with an adjustable crop saving attachment in a raised position, in accordance with an exemplary embodiment of the present invention.
Figure 4:
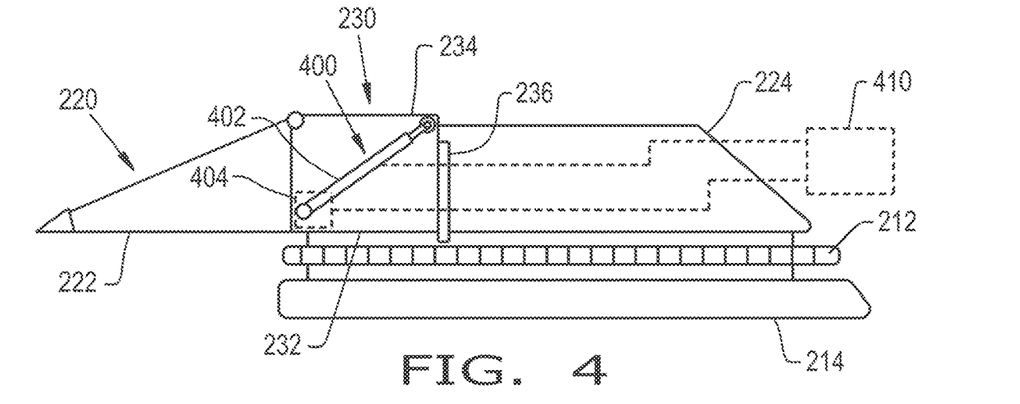
FIG. 4 illustrates a cross-sectional view of the crop saving attachment in the lowered position, taken across line 4-4 in FIG. 2, in accordance with an exemplary embodiment of the present invention.
Figure 5:
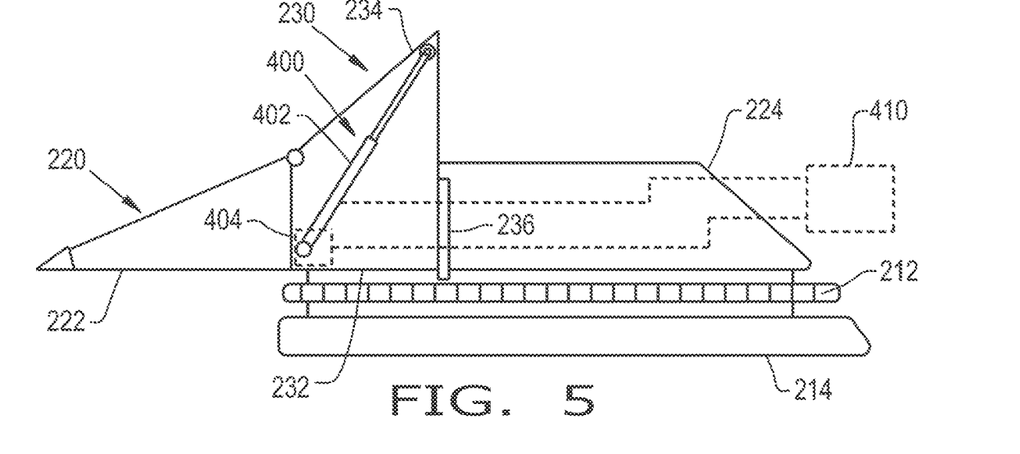
FIG. 5 illustrates a cross-sectional view of the crop saving attachment in the raised position, taken across line 5-5 in FIG. 3, in accordance with an exemplary embodiment of the present invention.

Each crop saving attachment 230 is supported by and coupled with a respective crop dividing member 220 and is adjustable within a range between a lowered position (FIG. 2) and a raised position (FIG. 3). In this manner, the crop saving attachment 230 can actively adjust its crop saving capacity to be more or less aggressive depending upon an operator's desires, the speed of the combine harvester, and/or the type of crop material being harvested. The crop saving attachment 230 is a multipart ear dam which generally includes a base member 232 that is fixedly attached to the crop dividing member 220, an upper, cover member 234 that is movably attached to the base member 232, and at least one flap, such as a pair of flaps 236, supported by the base member 232 and slideably associated with the upper member 234. Each crop saving attachment 230 may also include one or more actuator(s) 400 and a control device 410 for automatically raising and lowering the crop saving attachment 230 (FIGS. 4-5).

The base member 232 supports the upper member 234 and is positioned in between the corn snout 222 and the hood 224. The base member 232 can be connected to the corn snout 222 and/or the hood 224. As shown, the rear of the base member 232 is fixedly attached to the hood 224 via fasteners and/or welding the base member 232 to the hood 224. The base member 232 may be in the form of any desired shape which supports the upper member 234. For example, the base member 232 can be in the form of a floor plate or a multipart body which substantially matches the shape of the upper member 234. In the present exemplary embodiment, the base member 232 has a shape and size which substantially matches the shape and size of the upper member, except for including a recess that accommodates the actuator(s) 400 (FIGS. 3-5). The base member 232 can be separately attached to the hood 224, or the base member 232 may be formed monolithically with the hood 224 as a single unit. It should be appreciated that the base member 232 could be used to pivotally attach the corn snout 222. The base member 232 can be composed of any desired material, such as metal or plastic.

The upper member 234 is movably connected to the base member 232 and is adjustable, via the actuator(s) 400, between the lowered and raised positions (FIGS. 2-3). As used herein the "lowered position" defines the lowest position of the upper member 234 relative to the base member 232 and the "raised position" defines the highest position of the upper member 234 relative to the base member 232, and the upper member 234 may be adjusted into any number of positions within the range of the bounds defined by lowered and raised positions. For instance, in the raised position, the upper member 234 can be raised approximately 2-12 inches, such as 8 inches, above the lowered position. The upper member 234 can be slideably or pivotally attached to the base member 232, and the upper member 234 may pivotally mount the corn snout 222. The upper member 234 can be in the form of any desired shape and size, and the upper member 234 can be composed of any desired material, such as metal or plastic.

As shown in FIGS. 2-5, the upper member 234 is in the form of an outer shell 234 which fits over and covers the base member 232. The outer shell 234 includes a front end, a middle section, and a rear end. In more detail, the front end can be composed of a vertical front panel, the middle section can be composed of multiple, such as three, four, five, or more, horizontally disposed middle panels, and the rear section can be composed of a vertical rear panel. The outer shell 234 has at least two curved slots 238, located on each side of the middle section and adjacent to the front end, which accommodate a respective fastener for pivotally connecting the outer shell 234 to the base member 232 (FIG. 2). Alternatively, the base member 232 may include the curved slots and the upper member 234 has protrusions and/or fasteners that couple with the curved slots of the base member 232 (not shown). Further, the upper member 234 can be slideably attached to the base member 232, or the base and upper members 232, 234 may include corresponding protrusions and grooves which moveably couple the base and upper members 232, 234 together (not shown). The outer shell 234 may also include at least two slots 240, such as two slots 240 on each side of the rear end, that are respectively slideably associated with the flaps 236. The rear slots 240 can be in the form of any desired groove or cutout.

Alternatively, in another exemplary embodiment, the upper member 234 may not be in the form of an outer shell and may instead be in the form of a rear plate that is slideably connected to the base member 232 (not shown). In this configuration, the base member would be in the form of an ear dam, similar to the shape and size of the upper member 234 as shown, and the rear plate, upper member would be attached to the rear of the base member. The rear plate, upper member would extend above the base member and would slideably mount the flaps 236. Thereby, the rear plate, upper member can be lowered and raised in between the lowered and raised positions, by the actuator(s), and the flaps 236 would slide downwardly when the rear plate, upper member is raised.

The flaps 236 are attached to the crop saving attachment 230 so that a resting or neutral position of the pair of flaps 236 remains substantially unchanged as the upper member 234 is adjusted. Hence, a distance between a respective gathering chain 212 and a respective flap 236 remains substantially unchanged as the upper member 234 is adjusted. As used herein, "substantially unchanged" signifies that the distance between the end of a respective flap 236 and a gathering chain 212 can marginally fluctuate as the upper member 234 is lowered and/or raised. For example, the distance between the respective flap 236 and gathering chain 212 may not fluctuate more than approximately 2 inches in a single direction. The flaps 236 may either be fixedly attached to the base member 232 or slideably attached to the upper member 234. As shown, the flaps 236 are fixedly attached to the base member 232 by fasteners which extend through the slots 240, respectively, and the slots 240 thereby define a travel path of the upper member 234. Alternatively, the flaps 236 can be slideably attached to the upper member 234 by fasteners which slideably connect the flaps 236 to the slots 240 of the upper member 234, respectively, and thereby flaps 236 move relative to the upper member 234 such that the slots 240 define a travel path for the flaps 236. It is conceivable that the flaps 236 may be mounted on the crop saving attachment 230 at another location, such as at the sides of the middle section, or the flaps 236 may not be mounted onto the crop saving attachment 230 at all and may instead be mounted to the crop dividing member 220, such as onto each side of the hood 224.

Referring now specifically to FIGS. 4-5, the actuator(s) 400 may be connected to the base member 232 and the upper member 234 for selectively adjusting the upper member 234 relative to the base member 232. In one exemplary embodiment, the grain saving attachment 230 can include a single actuator 402 in the form of a cylinder 402, such as a hydraulic, pneumatic, or electric cylinder, that is connected to the bottom of the base member 232 and an underside of the middle section of the upper member 234. In another exemplary embodiment, the actuator(s) 400 can be in the form of a motor 404, such as an electric motor 404, as shown in phantom in FIGS. 4-5. For instance, one or two electric motors 404 can be supported by the base member 232 and connected to the upper member 234. The electric motor(s) 404 can be located adjacent to the curved slots 238. It is possible for the crop saving attachment 230 to include one or more cylinder(s) 402 and motor(s) 404.

The control device 410 can be operably coupled to each actuator 400. The control device 410 can automatically actuate one or more the actuator(s) 400, individually or collectively, to raise or lower the upper member(s) 234 in order to more or less aggressively save the crop material from falling out of the corn header 200. The control device 410 can also be operably coupled to a user interface so that an operator can selectively adjust the position of the upper member 234 as desired. The control device 410 may further be coupled with various sensors connected to the crop saving attachment 230 that indicate the presence of loose crop material, and thereby the control device 410 may adjust the upper member 234 in response to the feedback of the sensors (not shown). It should be appreciated that the control device 410 may be in the form of any desired electronic control device 410 (ECU), and the control device 410 may be incorporated into existing hardware and/or software of the agricultural vehicle. The control device 410 may include software code or instructions which are tangibly stored on a tangible computer readable medium. The computer readable medium may be in the form of a magnetic medium, e.g., a computer hard drive, an optical medium, e.g., an optical disc, solid-state memory, e.g., flash memory, or other storage media known in the art. Thus, any of the functionality performed by the control device 410 described herein may be implemented in software code or instructions which are tangibly stored on the tangible computer readable medium. Upon loading and executing such software code or instructions by the control device 410, the control device 410 may perform any of the functionality described herein.

Figure 6:
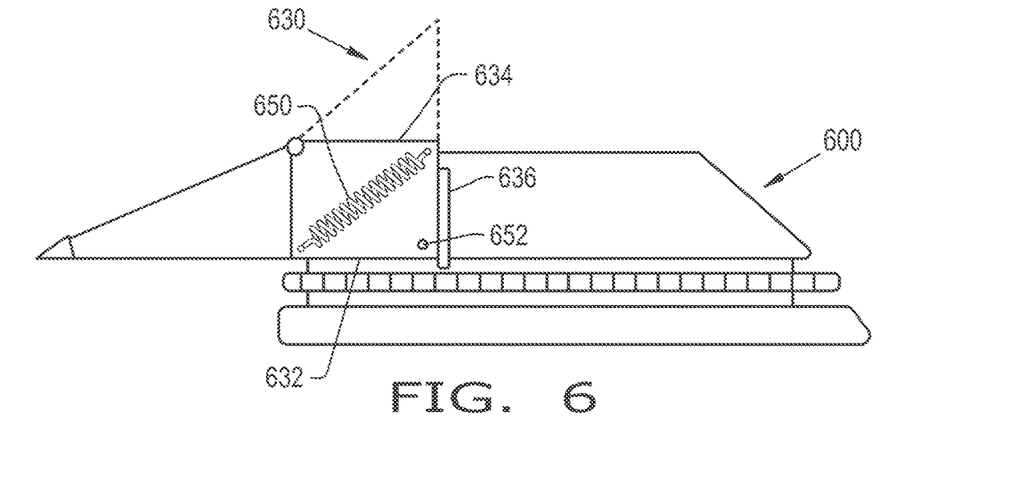
FIG. 6 illustrates a schematic view of another exemplary embodiment of an adjustable crop saving attachment, in accordance with an exemplary embodiment of the present invention.

Referring now to FIG. 6, there is shown another exemplary embodiment of an agricultural header 600. The agricultural header 600 may be substantially similar to the agricultural header 200 as discussed above, except that the crop saving attachment 630 is manually operated and thereby does not include the actuator(s) 400 and control device 410. Like parts have been identified with like reference characters except with the 600 series designation.

The crop saving attachment 630 generally includes a base member 632, an upper member 634 that is pivotally attached to the base member 632, flaps 636, a biasing member 650, and a locking feature 652. The biasing member 650 is connected in between the base member 632 and the upper member 634. The biasing member 650 can bias the upper member 634 in the raised position. The biasing member 650 can be in the form of a coil spring, such as a compression spring. It should be appreciated that the crop saving attachment 650 may include more than one biasing member 650, such two, three, or more biasing members 650. The locking feature 652 can be attached to the upper member 634 and/or to the base member 652 in order to selectively restrict the upper member 634 from being adjusted. For example, the base and upper members 632, 634 can include multiple and corresponding receiving holes (not shown) so that the locking feature 652 may lock the base and upper members 632, 634 together in various indexed positions. The locking feature 652 can be in the form of any desired locking member, such as a latch, pin, clasp, etc. As shown, the locking feature 652 is in the form of a locking pin 652. In operation, to lower or raise the crop saving attachment 630, an operator would unlock the locking feature 652 and forcibly move the upper member 634 downward or simply allow the biasing member 650 to move the upper member 634 to a desired position. Then, the operator may relock the locking feature 652. It should be appreciated that it may not be necessary to lock the upper member 634 in the raised position, as the biasing member 650 would keep the upper member 634 in the raised position.

In another exemplary embodiment of the agricultural header, in accordance with the present invention, the crop saving attachment may be designed as part of the crop dividing member. For example, the crop saving attachment can be monolithically formed with the corn snout. In this configuration, the integrated crop saving attachment and snout may be pivotally connected to the hood such that the integrated component pivots into a transport position at a location which is directly in front of the hood, i.e., behind crop saving attachment.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An agricultural header connectable to an agricultural vehicle, comprising:
a frame;
at least one row unit connected to the frame and including at least one gathering chain;

at least one crop dividing member connected to the frame; and a crop saving attachment supported by the at least one crop dividing member and being adjustable between a lowered position and a raised position, the crop saving attachment including:

a base member fixedly attached to the at least one crop dividing member;

an upper member movably attached to the base member and configured for adjusting between the lowered and raised positions; and a pair of flaps supported by the base member and slideably associated with the upper member so that a resting position of the pair of flaps remains substantially unchanged as the upper member is adjusted;

wherein the agricultural header is in the form of a corn header, the at least one crop dividing member includes a hood connected to the frame and a corn snout pivotally connected to the crop saving attachment, and the crop saving attachment is in the form of a multipart ear dam such that the base is connected to the hood and the corn snout is pivotally connected to the upper member, and a distance between the at least one gathering chain and a respective flap remains substantially unchanged as the upper member is adjusted.

2. The agricultural header of claim 1, wherein the upper member has a front end, and the upper member is pivotally attached to the base member adjacent to the front end.

3. The agricultural header of claim 1, wherein the upper member includes at least two slots and the flaps are respectively slideably associated with the at least two slots.

4. The agricultural header of claim 3, wherein the flaps are fixedly attached to the base member by fasteners which extend through the at least two slots, respectively, and the at least two slots define a travel path of the upper member.

5. The agricultural header of claim 3, wherein the flaps are slideably attached to upper member by fasteners which slideably connect the flaps to the at least two slots of the upper member, respectively, and the flaps move relative to the upper member such that the at least two slots define a travel path of the flaps.

6. The agricultural header of claim 3, wherein the upper member is in the form of an outer shell which covers the base member, the outer shell includes a front end, a middle section, and a rear end, and the at least two slots are positioned in the rear end of the upper member.

7. The agricultural header of claim 1, further including at least one actuator connected to the base member and the upper member, and the at least one actuator is configured for selectively adjusting the upper member relative to the base member.

8. The agricultural header of claim 7, further including a control device operably coupled to the at least one actuator and configured for automatically actuating the at least one actuator for raising and lowering the upper member.

9. The agricultural header of claim 1, further including a biasing member connected in between the base member and the upper member, the biasing member being configured for biasing the upper member in the raised position, and a locking feature attached to the upper member for selectively restricting the upper member from being adjusted.

10. A crop saving attachment for a crop dividing member of an agricultural header, comprising:

a base member configured for attaching to the crop dividing member;

an upper member movably attached to the base member and configured for adjusting between a lowered position and a raised position; and a pair of flaps supported by the base member and slideably associated with the upper member so that a resting position of the pair of flaps remains substantially unchanged as the upper member is adjusted;

wherein the upper member has a front end, the upper member is in the form of an outer shell which covers the base member, the outer shell includes the front end, a middle section, and a rear end, and the outer shell has an inner side facing the base member and an outer side facing the pair of flaps.

11. The crop saving attachment of claim 10, wherein the upper member is pivotally attached to the base member adjacent to the front end.

12. The crop saving attachment of claim 10, wherein the upper member includes at least two slots and the flaps are respectively slideably associated with the at least two slots.

13. The crop saving attachment of claim 12, wherein the flaps are fixedly attached to the base member by fasteners which extend through the at least two slots, respectively, and the at least two slots define a travel path of the upper member.

14. The crop saving attachment of claim 12, wherein the flaps are slideably attached to upper member by fasteners which slideably connect the flaps to the at least two slots of the upper member, respectively, and the flaps move relative to the upper member such that the at least two slots define a travel path of the flaps.

15. The crop saving attachment of claim 12, wherein the at least two slots are positioned in the rear end of the upper member.

16. The crop saving attachment of claim 10, further including at least one actuator connected to the base member and the upper member, and the at least one actuator is configured for selectively adjusting the upper member relative to the base member.

17. The crop saving attachment of claim 16, further including a control device operably coupled to the at least one actuator and configured for automatically actuating the at least one actuator for raising and lowering the upper member.

18. The crop saving attachment of claim 10, further including a biasing member connected in between the base member and the upper member, the biasing member being configured for biasing the upper member in the raised position, and a locking feature attached to the upper member for selectively restricting the upper member from being adjusted.

19. A method for selectively varying a crop saving capability of an agricultural header, comprising the steps of:

providing a crop saving attachment configured for attaching to the agricultural header and adjusting between a lowered position and a raised position, the crop saving attachment including a base member fixedly attached to at least one crop dividing member, an upper member movably attached to the base member and configured for adjusting between the lowered and raised positions, a pair of flaps supported by the base member and slideably associated with the upper member so that a resting position of the pair of flaps remains substantially unchanged as the upper member is adjusted, and at least one actuator connected to the base member and the upper member, wherein the upper member has a front end, the upper member is in the form of an outer shell which covers the base member, the outer shell includes the front end, a middle section, and a rear end, and the outer shell has an inner side facing the base member and an outer side facing the pair of flaps;

raising, by the at least one actuator, the upper member to be in the raised position to more aggressively save the crop material; and lowering, by the at least one actuator, the upper member to be in the lowered position to less aggressively save the crop material.

* * * * *